March 24, 1964 P. F. HAYNER 3,126,031
ELECTRO HYDRAULIC SERVO VALVE
Filed April 1, 1960 4 Sheets-Sheet 1
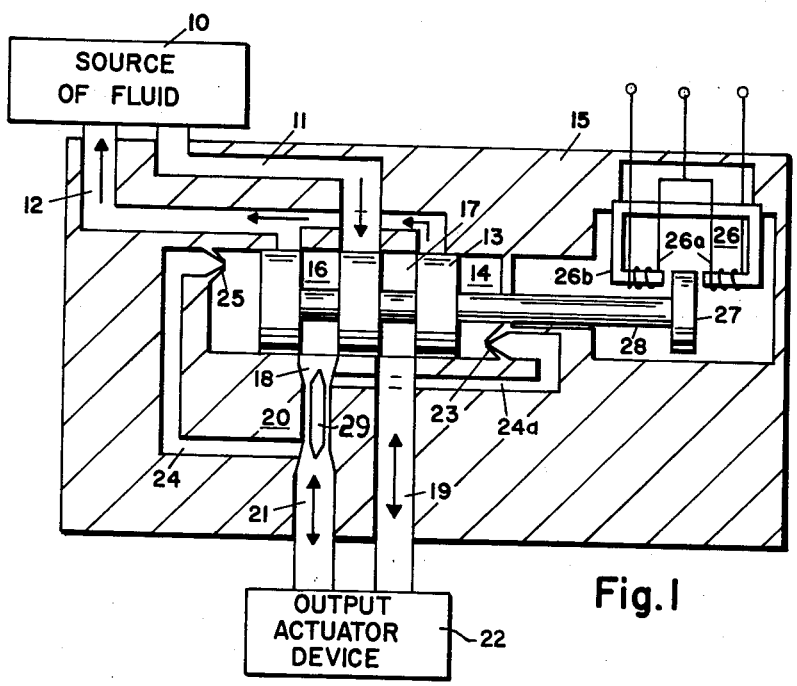
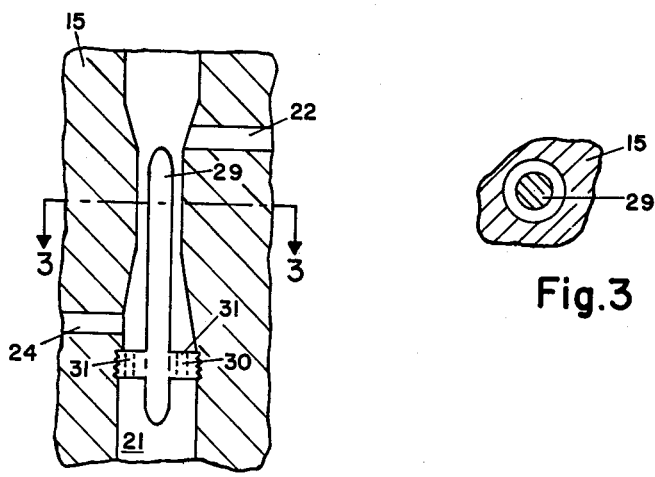
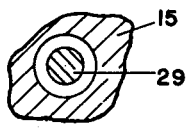
Paul F. Hayner
*INVENTOR*

Paul F. Hayner
*INVENTOR*

Paul F. Hayner
INVENTOR

March 24, 1964     P. F. HAYNER     3,126,031
ELECTRO HYDRAULIC SERVO VALVE
Filed April 1, 1960     4 Sheets-Sheet 4

Paul F. Hayner
*INVENTOR*

United States Patent Office 3,126,031
Patented Mar. 24, 1964

3,126,031
ELECTRO HYDRAULIC SERVO VALVE
Paul F. Hayner, Nashua, N.H., assignor to Sanders Associates, Inc., Nashua, N.H., a corporation of Delaware
Filed Apr. 1, 1960, Ser. No. 19,266
5 Claims. (Cl. 137—625.62)

This invention relates to the art of hydraulic control. More particularly the invention relates to hydraulic servo valves.

In conventional hydraulic servo control systems, the motion of the hydraulic load is generally non-linear relative to an input electrical signal. The reason for this being that conventional electro-hydraulic flow control servo valves commonly used in such systems have an output load that is not dependent on input signal alone. The output of such valves usually depends upon system variables such as load pressure, supply pressure and return pressure. In many applications it is desirable that the flow control servo valve should have an output flow that varies only as a function of the input electrical signal irrespective of non-linear system variables. Prior art devices have been devised to accommodate load by controlling the flow characteristics of the fluid in an output actuator. Such devices, however, are relatively complex, unreliable and uneconomical to manufacture.

It is, therefore, an object of the invention to provide an improved hydraulic, servo valve having feedback.

A further object of the invention is to provide an improved hydraulic, servo valve wherein the flow characteristics of the output fluid vary only with an input signal and are independent of changes in loading.

Another object of the invention is to provide an improved, flow-control, hydraulic, servo valve wherein the velocity of the output flow varies only with an input signal and is independent of changes in loading.

Yet another object of the invention is to provide an improved, hydraulic, servo valve having feedback wherein the feedback signal operates substantially independently of an input pilot control signal.

Still another object of the invention is to provide an improved flow-control, hydraulic, servo valve characterized by simplicity of structure, a high degree of reliability and economy of manufacture.

A still further object of the invention is to provide an improved flow-control, hydraulic, servo valve capable of reliable operation over a substantial temperature range.

In accordance with the invention, there is provided a hydraulic, servo valve having feedback. The valve comprises a source of fluid under pressure and a valve means coupled to the source. The valve means has an output control outlet and a movable member adapted to control the application of the fluid under pressure through the outlet in accordance with an input signal. Differential-pressure means are coupled to the outlet for developing a differential pressure which varies in accordance with a predetermined, flow characteristic of the fluid. Feedback pressure means are provided which couple the differential pressure means and the movable member to vary its position in accordance with the differential pressure and provide the feedback.

As exemplified, for example, in FIG. 2, the invention includes in its contemplation a flow-control, hydraulic, servo valve. In this mode, a pilot-valve positions a control-valve member to control the application of fluid under pressure through an output control outlet in the control-valve. A restricted orifice is coupled to the outlet to develop a differential pressure across the orifice; the differential pressure thus varies in accordance with the velocity of flow of the fluid through the orifice. The differential pressure is coupled back to a movable pilot-valve member to vary its position and, hence, reposition the control-valve member to produce a substantially constant fluid velocity flowing through the output control outlet.

For a better understanding of the present invention together with other and further objects thereof, reference is made to the following description taken in connection with the accompanying drawings, and its scope will be pointed out in the appended claims.

In the drawings, FIG. 1 is a partially schematic sectional view of a single stage, spool type, hydraulic servo valve embodying the invention;

FIG. 2 is a detail drawing, partly in section, of a restricted outlet in the valve in FIG. 1;

FIG. 3 is a sectional view of the orifice shown in FIG. 2 taken along the lines 3—3;

Figure 4:
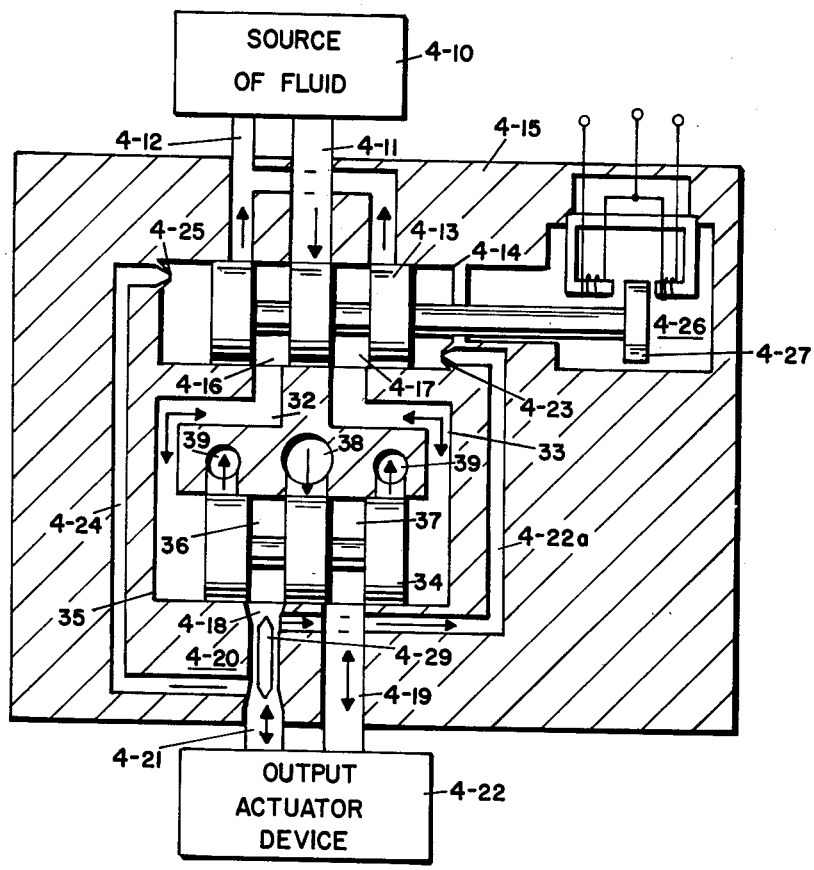
FIG. 4 is a partially schematic, sectional view of a modification of the valve in FIG. 1.

*Description and Explanation of the Hydraulic Valves in FIGS. 1, 2, and 3*

Referring now in more detail to the drawing and with particular reference to FIG. 1, there is here illustrated a flow control, hydraulic servo valve having feedback. The embodiment of FIG. 1 generally comprises a single-stage, four-way, spool-type, hydraulic, servo valve in which a movable piston-valve is disposed in a cylinder within the valve body. The piston valve is adapted by means of a solenoid torque motor to control the application of the fluid through an output control outlet in accordance with an input electrical signal. A restricted orifice is disposed in series with a control outlet for developing a differential pressure. The restricted orifice is hydraulically coupled to either side of the piston valve and the output control outlets are coupled to an output actuator device.

Thus valve means are coupled to the source 10 through an input pressure conduit 11 and return conduit 12 having a pair of branches, as shown. The valve means include a movable piston-valve 13 disposed within a cylinder 14 in the valve body 15. The piston valve is undercut to provide three piston-valve-lands and a pair of pressure chambers 16 and 17. The chambers 16 and 17 are coupled to a pair of output control outlets 18 and 19, respectively. A restricted orifice, generally indicated at 20, is connected in series with the outlet 18 and an output control conduit 21. The orifice 20 includes a restricting pin 29 coaxially disposed therein as will be described hereinafter. The output control outlet 18 and control conduit 21 are connected, as shown to an output actuator device 22 such as a servo motor. One side of the restricted orifice 20 is coupled to the righthand side of the piston valve 13 through a feedback passageway 24a and an orifice 23. The other side of the orifice 20 is hydraulically coupled to the left hand side of the piston valve 13 through a passageway 24 and orifice 25.

The piston-valve 13 is actuated in response to a solenoid, torque motor generally indicated at 26. The torque motor 26 comprises a pair of stator windings 26a disposed about a stator permeable magnetic core 26b as shown. The stator windings 26a are connected in series, as shown, thus adapting them for push-pull connection to a source of signal current. The motor 26 includes a movable armature 27 affixed to a rod 28 extending from the right end of the piston valve 13.

Referring now to FIG. 2, there is shown one form of restricted orifice 20 in which a tapered plug 29 is utilized as shown. The plug 29 is connected to a threaded disc 30 which is screwed into place in the control conduit 21 as shown. The disc 30 has openings 31 therein to permit fluid to flow between the output control outlet 18 and control conduit 21.

Referring now to FIG. 3, there is shown a sectional view of the effective cross-sectional area for fluid flow taken along 3—3 in FIG. 2.

In typical servo valve applications, the differential pressure that appears across an output actuator device varies in response to variations in loading. When the load increases, for example, the output fluid flow tends to decrease and the differential pressure to increase. In particular, the fluid flowing through the output actuator device tends to vary with the loading variations. In the present invention, a restriction is placed in series with an output control outlet to develop a predetermined differential pressure across the restriction, the differential pressure being chosen to have a definite relation to a particular input control signal. The valve itself operates in such a manner as to provide an output fluid flow which varies in accordance with this input signal. When the velocity of output fluid flow varies out of a desired proportion relative to the input signal, it is frequently desirable to cancel such variations. The restriction in the output develops a differential pressure which is in turn related to the velocity of fluid flow. The differential pressure thus produced is fed-back within the valve in such a manner as to provide a predetermined output flow velocity that varies only in accordance with the input signal.

Referring now to FIG. 1, a differential input current $\Delta i$ causes the armature 27 of the motor 26 to move, for example, to the right. The motion of the central land of the piston-valve 13 opens the input pressure conduit 11 to permit fluid flow from the source 10 through the chamber 16, output control outlet 18, restricted orifice 20, and conduit 21 to the output actuator device 22. Fluid returns through the conduit 19 to the chamber 17 and, thence, through the return conduit 12 to the source 10.

If the differential pressure developed across the restricted orifice 20 is in excess of that desired, indicating an excessive velocity flow, fluid under pressure is coupled through the passageway 22 and orifice 23 to the right side of the piston valve 13. Fluid under a lesser pressure is coupled through the passageway 24 and orifice 25 to the left side of the piston valve 13. This has the effect of introducing a differential pressure across the piston valve 13 which tends to displace it to the left and restrict the opening of input pressure conduit 11 into the chamber 18 and reduce the velocity of fluid flow. Conversely, if the differential pressure developed across orifice 20 is too little, it appears across the piston valve 13 in such an manner as to displace the piston to the right and effectively increase the fluid velocity.

The differential pressure developed across the restricted orifice of the type shown in FIGS. 2 and 3 varies as a function of the square of velocity. Since fluid flow through this type of orifice is essentially laminar, the differential pressure developed is primarily a function of viscous shear, and tends to vary with temperature. Such temperature variations may be compensated by choosing a suitable material and configuration for the pin 29 as to overcome non-linear pressure variation.

*Description and Explanation of the Servo Valve in FIG. 4*

Referring now in more detail to FIG. 4, there is here illustrated a two stage, spool-type, four-way, hydraulic, servo valve having feedback. The embodiment of the invention as illustrated in FIG. 4 differs from that in FIG. 1 in that a second, or control valve stage, has been added. The first stage will be referred to as the pilot-valve and the second stage as the control valve. Otherwise, this valve is generally similar to that illustrated in FIG. 1 and described above. Accordingly, corresponding units or elements in FIG. 4 are indicated by the same reference numerals as units and elements in FIG. 1 with a prefix of 4–.

Thus the source 10 is coupled to a pilot valve means having pilot pressure chambers 16 and 17 and a movable piston-valve 13 disposed in a cylinder 14 of the valve body 15. The piston-valve 13 is adapted by means of the solenoid torque motor 26 selectively to vary the pressure in the pilot chambers 16 and 17 in accordance with an input electrical signal. The pilot piston-valve 13 controls the application of fluid under pressure from the input pressure conduit 11 into either of the chambers 16 or 17. Pilot chambers 16 and 17 are coupled to a pair of pilot fluid passageways 32 and 33 to the opposite ends of a control piston valve 34 as shown. The piston valve 34 is disposed in a cylinder 35 formed in the valve body 4–15 and is under cut to provide a pair of control pressure chambers 36 and 37. The piston valve 34 has three valve-lands, as shown, which control the application of fluid under pressure through a pressure port 38 to either of the chambers 36 or 37. The outermost lands control the application of fluid return through a pair of fluid return ports 39. Ordinarily, the control valve is coupled to the same source as the pilot valve, but this need not be the case. The control chambers 36 and 37 are coupled, respectively, to output control outlets 4–18 and 4–19 to the output actuator device 22. In series with the outlet 4–18 is a restricted orifice 4–20 having a pin 4–29 inserted in the manner illustrated in FIGS. 2 and 3 above. The restricted orifice 4–20 is coupled through conduit 4–21 to the output actuator 22. As described above, the restricted orifice 4–20 develops a differential pressure varying in accordance with the velocity of fluid flow which is coupled back through the feedback passageways 4–22 and 4–24 and the nozzle openings 4–23 and 4–25 to the opposite ends of the piston valve 13.

The piston-valve 13 is displaced in accordance with an input electrical signal impressed on the solenoid torque motor 26. When the differential current in the motor 26 is such that the piston-valve 13 is displaced to the right, for example, fluid under pressure flows from the input pressure conduit 11 through the chamber 16 and pilot passageway 33a to the left side of the piston-valve 34. Fluid returns from the right side of the piston-valve 34 through pilot passageway 33 to the pilot chamber 17 and through the fluid return conduit 12 to the source 10. The differential pilot pressure across the piston valve 34 is such as to displace it to the right also. Fluid under pressure flows from the port 38 into the control chamber 36 and output control outlet 4–18 through the restricted orifice 4–20 and conduit 4–21 to the output actuator device 22. Fluid actuator 22 returns through the conduit 4–19 to the control chamber 37 and out the control fluid return port 39.

The differential pressure developed across the restricted orifice 4–20 is coupled through the passageways 4–22 and 4–24 and nozzle openings 4–23 and 4–25 to displace the pilot piston-valve 13 in such a manner as to compensate for such variations in fluid velocity that take place through the orifice 4–20 other than as determined by an input electrical signal.

If the differential pressure developed across the restricted orifice 4–20 is in excess of that desired, indicating an excessive velocity flow, fluid under pressure is coupled through the passageways 4–22 and orifice 4–23 to the right side of piston valve 13. Fluid under a lesser pressure is coupled through the passageway 4–24 and orifice 4–25 to the left side of piston 15. This has the effect of introducing a differential pressure across the piston valve 13 which tends to displace it to the left increasing the opening of the input pressure conduit 11 to the chamber 17, which has the effect of increasing the flow of the right hand side of piston 34. This causes piston 34 to be displaced to the left and to restricting the opening 4–18 thus reducing the velocity of fluid flow. Conversely, if the differential pressure developed across the orifice 20 is too little it appears across the piston valve 13 in such a manner so as to displace the piston valve 13 to the right and effectively increase the fluid velocity.

Figure 5:
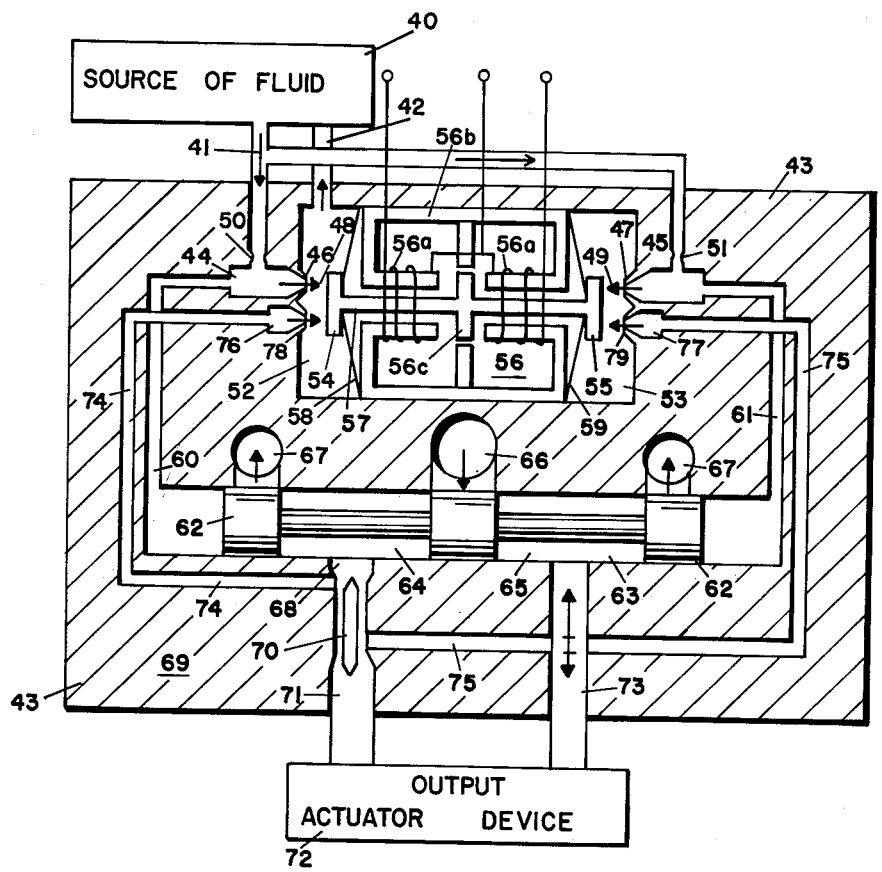
FIG. 5 is a partially schematic sectional view of a further modification of the valve in FIG. 1.

*Description and Explanation of the Servo Valve in FIG. 5*

Referring now in further detail to FIG. 5, there is here illustrated another embodiment of a flow-control, hydraulic, servo valve having feedback. The valve as shown here has two stages: a pilot valve and a control valve. The pilot valve means includes a variable pressure chamber coupled to a source of fluid. The chamber has a nozzle opening to produce a fluid jet stream along an axis and a movable pilot valve member to move along the axis in opposition to the jet stream to vary the pressure in the chamber in accordance with an input signal.

Thus, a source 40 of fluid under pressure is coupled to a pilot valve means through an input pressure conduit 41 and fluid return conduit 42. The pilot valve and control valve are disposed in a valve body 43. The pilot valve includes a pair of variable pressure chambers 44 and 45 having nozzle openings 46 and 47 which produce fluid jet streams along axes 48 and 49. The chambers are connected to the input pressure conduit 41 through a pair of restricted orifices 50 and 51. Fluid flows from the source 40 through the restricted orifices 50 and 51 and the variable pressure chambers 44 and 45, to a pair of input low pressure chambers 52 and 53, which are directly connected to the input fluid return conduit 42. The pilot valve includes a pair of movable members 54 and 55 adapted to move along axes 48 and 49 in opposition to the jet streams to vary the pressure in the chambers 44 and 45 in accordance with an input signal disc shape.

A solenoid torque motor, generally indicated as 56, is disposed within the valve body 43, as shown. The torque motor includes a movable armature 56c a pair of series-connected, stator windings 56a wound around the arms of a permeable magnetic core 56b. The armature is affixed to the movable pilot members 54 and 55 through a rod 57 which is suspended by a pair of diaphragms 58 and 59. The diaphragms seal off the solenoid motor from the low pressure chambers 52 and 53. The variable chambers 45 and 46 are hydraulically coupled through a pair of pilot fluid passageways 60 and 61 to the opposite ends of a control piston valve 62.

The piston valve 62 is disposed in a cylinder 63 formed in the valve body 43. The control piston-valve 62 is undercut to provide a pair of control pressure chambers 64 and 65, and three piston valve lands. Fluid under pressure is applied through pressure port 66 to the central land of the control piston valve 62. Fluid returns through a pair of fluid return ports 67 adjacent the outermost lands of the piston valve 62. The control chamber 64 is coupled through an output control outlet 68 connected in series with a restricted orifice 69 and a restriction pin 70 and conduit 71 to an output actuator device 72. The chamber 65 is coupled through an output control outlet 73 to the output actuator device 72. The differential pressure developed across the orifice 69 is coupled through a pair of feedback passageways 74 and 75 to a pair of feedback pressure chambers 76 and 77. Fluid under pressure flows through nozzle openings 78 and 79 from the chambers 76 and 77 respectively into the low pressure chambers 52 and 53.

The operation of the hydraulic servo in FIG. 5 will now be considered with respect to an input electrical signal which provides a differential current $\Delta i$ such that the solenoid armature 56c is displaced to the right. Motion of the pilot member 55 to the right tends to occlude the effective opening of the nozzle 47 in the chamber 45 and increase the pressure in that chamber. The motion of the pilot valve member 54 to the right tends to increase the effective opening of the nozzle 46 in the chamber 44 to decrease the pressure in that chamber. The differential pressure thus obtained is coupled hydraulically through the pilot fluid passageways 60 and 61 to the opposite ends of the control piston valve 62. The piston valve 62 is then displaced to the left, thus controlling the application of fluid under pressure from the port 66 to chamber 65 through the output control outlet 73 to the output actuator device 72. Fluid return from the actuator device 72 through the conduit 71, restricted orifice 69, output control 68, control pressure chamber 69 to the return port 67. The differential pressure developed across the restricted orifice 69 is coupled through the feedback toward passageways 74 and 75 to the pilot valve movable members 54 and 55 respectively. If the differential pressure, due to fluid flow through the orifice 69, is greater than that desired, the pilot members 54 and 55 are displaced to the left. In response to this motion, the pressure in the chamber 45 tends to decrease and the pressure in the chamber 44 tends to increase to displace the control piston valve 62 to the right and decrease the velocity of fluid flow in the output control outlets. Conversely, when the differential pressure across the orifice 69 is less than desired, the pilot members 54 and 55 are displaced to the right to further decrease the pressure in the chamber 44 and increase the pressure in the chamber 45 to displace the control piston valve 62 farther to the left and further increase the velocity of the fluid flow in the output control outlets 68 and 73. The output fluid velocity thus varies only in accordance with the input electrical signal and is substantially independent of variations in loading.

Figure 6:
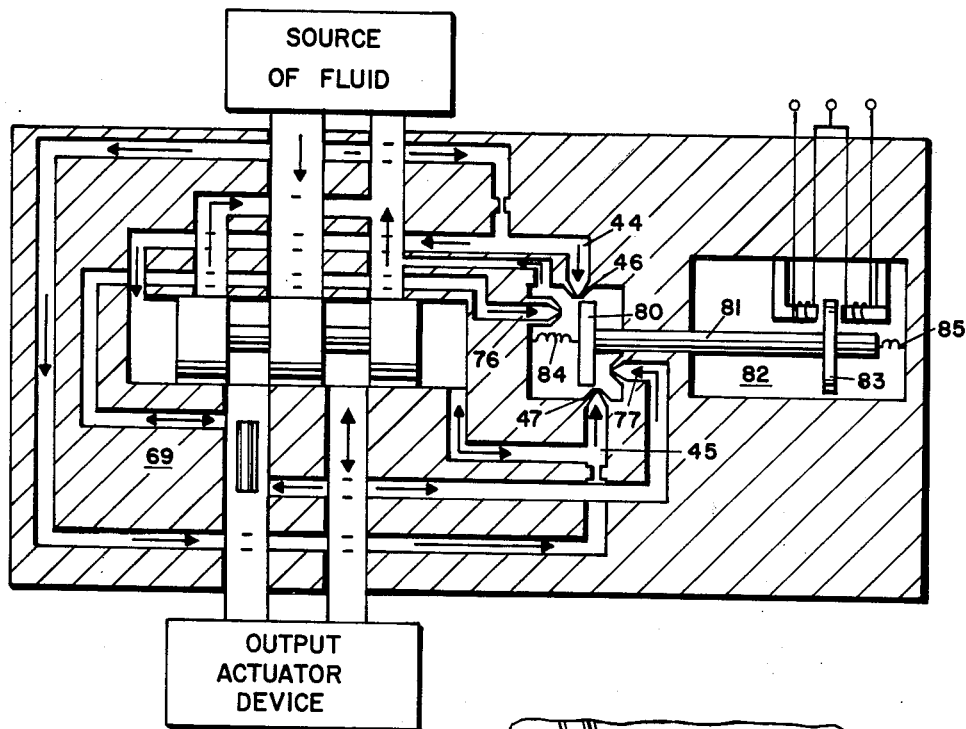
FIG. 6 is a partially schematic section view of a further sectional modification of the valve in FIG. 1.
Figure 7:
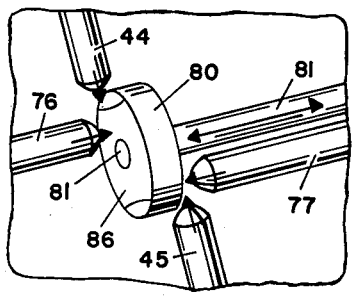
FIG. 7 is a schematic perspective view of a pilot member and orifices of the valve in FIG. 6.

*Description and Explanation of the Hydraulic Valve in FIGS. 6 and 7*

Referring now to FIGS. 6 and 7, the hydraulic valve here illustrated is a modification of the valve shown in FIG. 5 and described above. Here, a single movable pilot valve member is adapted to move transversely across a jet stream of fluid emanating from a variable pressure chamber having a nozzle opening. This transverse motion across the axis of the fluid jet stream restricts the effective opening of the nozzle and varies the pressure in the chamber in accordance with an input signal. The differential pressure is fed back to the movable pilot valve member along an axis orthogonal to the axes of primary pilot valve pressure control; i.e., along an axis perpendicular to the jet-stream axes emanating from the pilot variable pressure chambers. Since the valve, as shown in FIGS. 6 and 7, is generally similar to the valve in FIG. 5, corresponding elements are indicated by identical reference numerals.

In detail, movable pilot member 80 is affixed to a rod extension 81 extending from the armature 83 of a solenoid torque motor generally indicated as 82.

The movable pilot member 80 is disposed adjacent variable pressure chambers 44 and 45 and operates in opposition to a pair of bias springs 84 and 85. The feedback chambers 76 and 77 are so disposed as to provide feedback pressure along axes perpendicular to the jet stream axes of the chambers 44 and 45. As shown more particularly in FIG. 7, the movable member 80 comprises a cylindrical annular shell coaxially mounted on the rod 81 by means of a support member 86.

The operation of this embodiment is substantially similar to that described with reference to FIG. 5. As shown here, however, the pressure in the chambers 44 and 45 is controlled by varying the position of the member 80 axially relative to the rod 81 and transversely relative to the chambers 44 and 45. The outside surface of the member 80 is rigid and dynamically balanced. The feedback pressure emanating from the chambers 76 and 77 operates against the supported member 86 to displace the pilot member 80 in accordance with variations in fluid velocity that occur in the restricted orifice 69.

Figure 8:
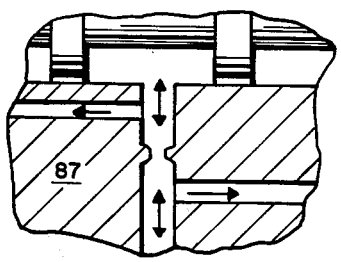
FIG. 8 is a detail drawing, partly in section of a restricted outlet in the valve in FIG. 7.

In FIG. 8, a modification of the restricted orifices 20 and 69 as used in FIGS. 1, 4 and 5 is shown. This orifice consists of an extremely narrow restriction. The effect of a restriction of this type is to cause the differential pressure developed across the restricted orifice to be independent of temperature. The flow in the orifice 87, as compared with that described above with reference to FIGS. 1, 4 and 5, is not laminar. Rather, the fluid flow either tends to be turbulent and the differential pressure developed tends to be independent of velocity changes.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A hydraulic, servo valve having feedback, comprising: a source of fluid under pressure; valve means coupled to said source and having an output control outlet and a movable member adapted to control the application of said fluid under pressure through said outlet in accordance with an input signal; a thermally responsive differential-pressure means coupled to said outlet for developing a differential-pressure varying in accordance with a predetermined, flow characteristic of said fluid and its temperature; and feedback-pressure means coupling said thermally responsive differential-pressure means and said movable member to vary its position in accordance with said differential pressure and provide said feedback.

2. A hydraulic, servo valve having feedback, comprising: a source of fluid under pressure; pilot-valve means including a variable pressure chamber coupled by a passageway to said source of fluid, said chamber having a nozzle to produce a fluid jet-stream along an axis, and a movable pilot-valve member adapted to move in a straight line along said axis in opposition to said jet stream to restrict the effective nozzle opening and vary the pressure in said chamber in accordance with an input signal; control valve means coupled to said chamber and having an output control outlet, said control valve means being adapted to control the application of fluid under pressure through said outlet in accordance with variations in pressure from said chamber; differential pressure means coupled to said outlet for developing a differential-pressure varying in accordance with a predetermined flow characteristic of said fluid; and feedback-pressure means coupling said differential-pressure means and said movable pilot-valve member to vary its position in accordance with said differential pressure and provide said feedback.

3. A hydraulic, servo valve having feedback, comprising: a source of fluid under pressure; valve means coupled to said source and having an output control outlet and a movable piston member adapted to control the application of said fluid under pressure through said outlet in accordance with an input signal; a variable thermally responsive differential-pressure means coupled to said outlet for developing a differential-pressure varying in accordance with a predetermined, flow characteristic of said fluid; and feedback-pressure means coupling said thermally responsive differential-pressure means and said movable member to vary its position in accordance with said differential pressure and provide said feedback.

4. A flow-control, hydraulic, servo valve having feedback, comprising: a source of fluid under pressure; valve means coupled to said source and having an output control outlet and a movable member adapted to control the application of said fluid under pressure through said outlet in accordance with an input signal; a variable thermally responsive restricted-orifice means coupled to said outlet for developing a differential-pressure across said orifice varying in accordance with the velocity of flow of said fluid; and feedback-pressure means coupling said differential-pressure and said movable member to vary its position in accordance with said differential pressure and provide said feedback to produce an output fluid velocity varying only with said input signal.

5. A flow-control, hydraulic, servo valve having feedback, comprising: a source of fluid under pressure; pilot-valve means including a variable pressure chamber coupled to said source of fluid, said chamber having a nozzle to produce a fluid jet-stream along an axis, and a movable pilot-valve member adapted to move along said axis in opposition to said jet-stream to vary the pressure in said chamber in accordance with an input signal; control valve means coupled to said chamber and having an output control outlet, said control valve means being adapted to control the application of fluid under pressure through said outlet in accordance with variations in pressure from said chamber; a restricted-orifice means coupled to said outlet for developing a differential-pressure across said orifice varying in accordance with the velocity of flow of said fluid; and feedback-pressure means coupling said differential-pressure and said movable pilot-valve member to vary its position in accordance with said differential pressure and provide said feedback to produce an output fluid velocity varying only with said input signal.

References Cited in the file of this patent

UNITED STATES PATENTS

| | | |
|---|---|---|
| 2,053,797 | King | Sept. 8, 1936 |
| 2,540,193 | Eckman | Feb. 6, 1951 |
| 2,654,348 | Beck | Oct. 6, 1953 |
| 2,862,523 | Obermaier | Dec. 2, 1958 |
| 2,909,195 | Keyt | Oct. 20, 1959 |
| 2,939,430 | Westbury | June 7, 1960 |
| 3,012,577 | Ambrosini | Dec. 12, 1961 |